(12) United States Patent (10) Patent No.: US 8,355,949 B1
Agostino et al. (45) Date of Patent: *Jan. 15, 2013

(54) ENHANCED HYPERLINK FEATURE FOR WEB PAGES

(75) Inventors: Michael N. Agostino, Glendale, CA (US); Jason P. Fields, Los Angeles, CA (US); Joseph Chen, Los Angeles, CA (US); Yovav Meydad, Los Angeles, CA (US); Jason Levine, Los Angeles, CA (US); Michael Radford, Sierra Madre, CA (US); David E. Benson, Pasadena, CA (US); Christopher Starace, Pasadena, CA (US); Eric J. Kim, Sherman Oaks, CA (US)

(73) Assignee: Ubermedia, Inc., Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/418,280

(22) Filed: Mar. 12, 2012

Related U.S. Application Data

(63) Continuation of application No. 11/975,362, filed on Oct. 18, 2007, now Pat. No. 8,135,617.

(60) Provisional application No. 60/852,772, filed on Oct. 18, 2006, provisional application No. 60/905,005, filed on Mar. 2, 2007.

(51) Int. Cl.
*G06Q 30/00* (2012.01)
(52) U.S. Cl. .......................................... 705/14.4; 705/1.1

(58) Field of Classification Search ................... 705/1.1, 705/4.4
See application file for complete search history.

(56) References Cited

U.S. PATENT DOCUMENTS

| 2002/0046102 A1* | 4/2002 | Dohring et al. ................ 705/14 |
| 2002/0103781 A1* | 8/2002 | Mori et al. ....................... 707/1 |
| 2007/0050251 A1* | 3/2007 | Jain et al. ........................ 705/14 |
| 2007/0050252 A1* | 3/2007 | Jain ................................. 705/14 |
| 2007/0050253 A1* | 3/2007 | Biggs et al. .................... 705/14 |
| 2007/0050263 A1* | 3/2007 | Horimoto ....................... 705/26 |
| 2008/0086356 A1* | 4/2008 | Glassman et al. ............. 705/10 |

* cited by examiner

*Primary Examiner* — Jagdish Patel
*Assistant Examiner* — Sara C Hamilton
(74) *Attorney, Agent, or Firm* — Andrew S. Naglestad

(57) ABSTRACT

The invention in some embodiments features a contextual content delivery system (CCDS) for enhancing conventional web content with pop-up bubbles that display information when a cursor hovers over a word, link, or icon. The CCDS is configured to identify words or links in a document, determine their context, select the appropriate bubble from a plural of bubble types for each of the words or links, select content for each bubble based, in part, on the context in which the words and hyperlinks are used. The context can be determined from various sources including the resource in which the word or link appears and the target resource to which the link points. Thereafter, the CCDS enhances the words or links so that bubbles are automatically invoked in response to the appropriate trigger.

2 Claims, 21 Drawing Sheets

| Bubble Type | | Base URL | |
|---|---|---|---|
| Wikipedia | 510 | Wikipedia.org | 512 |
| Movie / Movie Star | 520 | Imdb.com, movies.yahoo.com | 522 |
| Financial | 530 | Finance.yahoo.com, moneycentral.msn.com, marketwatch.com, finance.google.com, money.cnn.com, www.investor.reuters.wallst.com, www.cnbc.com | 532 |
| Map | 540 | maps.yahoo.com, maps.google.com, mapquest.com | 542 |
| Video | 550 | Display a video player for these file suffixes: .wmv, .avi, .wma, .mov, .mpg, .ram, .mp4, .mpeg, .divx | 552 |
| Audio | 560 | Display an audio player for these file suffixes: .mp3, .wav, .rm | 562 |
| Weather | 570 | weather.com, wunderground.com, acuweather.com, .cnn.com/weather, weather.yahoo.com | 572 |

FIG. 5

FIG. 9A
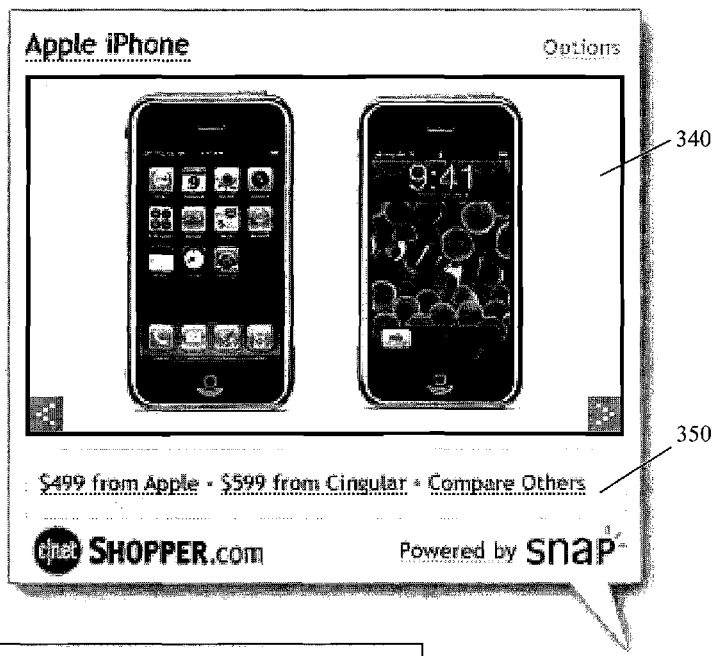
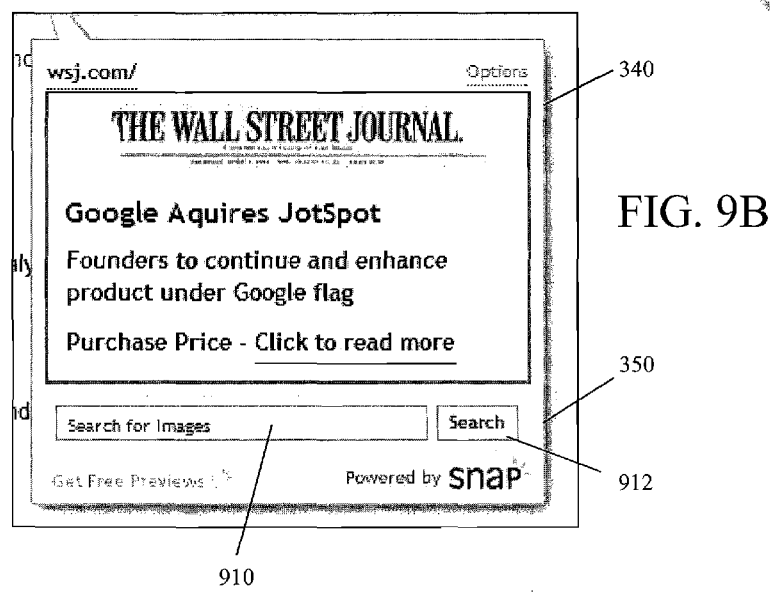
FIG. 9B

ENHANCED HYPERLINK FEATURE FOR WEB PAGES

CROSS-REFERENCE TO RELATED APPLICATION(S)

This application is a continuation of U.S. application Ser. No. 11/975,362, filed Oct. 18, 2007, now U.S. Pat. No. 8,135,617 which claims the benefit under 35 U.S.C. §119(e) of U.S. Provisional Patent Application Ser. No. 60/852,772, filed Oct. 18, 2006 and U.S. Provisional Patent Application Ser. No. 60/905,005, filed Mar. 2, 2007, all of which are hereby incorporated by reference herein.

TECHNICAL FIELD

The invention generally relates to a technique for selecting and delivering information in connection with a document. In particular, the invention relates to a system and method for selecting and delivering information associated with words, phrases, and hyperlinks in web pages based on the context in which they appear.

BACKGROUND

Internet publishers are constantly looking for new ways to drive traffic to their websites where they host various types of interesting content. Once viewers have navigated to a publisher's website, the challenge then becomes how to keep the visitor on the website where they might make a purchase, click on an advertisement, or otherwise help to underwrite the expense of the website. This becomes especially difficult when the publisher's content includes hyperlinks that a visitor may click through without returning from. There is therefore a need for a technique to deliver to the visitor information related to the target page without the visitor leaving the publisher's website. There is also a need for a technique with which to monetize the delivery of this information without imposing a financially burden on the publisher.

SUMMARY

The invention in some embodiments features a contextual content delivery system (CCDS) for enhancing conventional web content with pop-up bubbles that display information when a cursor hovers over a word, link, or icon. The CCDS is configured to identify words or links in a document, determine their context, select the appropriate bubble from a plural of bubble types for each of the words or links, select content for each bubble based, in part, on the context in which the words and hyperlinks are used. The context can be determined from various sources including the resource in which the word or link appears and the target resource to which the link points. Thereafter, the CCDS enhances the words or links so that bubbles are automatically invoked in response to the appropriate trigger.

The particular bubble that is associated with a word or link is selected from a set of bubble types including an RSS bubble, movie bubble, wikipedia bubble, social networking bubble, stock or financial bubble, news bubble, video bubble, audio bubble, photo bubble, product bubble, map bubble, weather bubble, or preview bubble. Each bubble type and the content with which it is populated is selected to be of particular relevance to relevant to the user. In addition, bubbles may be enabled with for bookmarking, pinning, and resizing.

BRIEF DESCRIPTION OF THE DRAWINGS

The present invention is illustrated by way of example and not limitation in the figures of the accompanying drawings, and in which:

FIG. 5 is a table showing exemplary bubble types in the first column and corresponding uniform resource locator(s) (URL(s)) and file type(s) supported by the bubble type, in accordance with one embodiment of the present invention;

FIG. 9A is an exemplary bubble type for a consumer product, in accordance with one embodiment of the present invention;

FIG. 9B is an exemplary bubble type for a news service, in accordance with one embodiment of the present invention;

DETAILED DESCRIPTION OF THE PREFERRED EMBODIMENT

The invention in the preferred embodiment is software utility configured to enable an end user viewing a web page having enhanced hyperlinks or bubble-enabled text/graphics to display select information associated with the targets of those hyperlinks or text/graphics in a separate window without the user necessarily navigating to a target. The window, referred to herein as a bubble, is invoked when the user triggers the bubble window by hovering a cursor or other pointing device over the enhanced hyperlink or dedicated bubble icon. The bubble superimposed over a portion of the web page in proximity to the enhanced hyperlink. The bubble generally does not occupy the entire display or cover the entire underlying web page. The conventional hyperlink functionality associated with the hyperlink is also unaffected, thereby allowing the user to click through to the hyperlink's target page before, during, and after the bubble is invoked.

The bubble in the preferred embodiment comprises a first area and a second area. The first area is configured to display media and/or an abstract of information associated with the target of the hyperlink. The abstract may be configured to present the user with various forms of content including web content, text, pictures, audio, video, advertisements, offers, or combination thereof. The second area of the bubble in the preferred embodiment is configured to display alternative selection options. Alternative selection options refers to hyperlinks and tools that are conceptually related to the target of the enhanced hyperlink which, when selected, cause the user to navigate to a website or other resource different than the target. The purpose of the alternative selection options is to infer the intent of the end user and deliver options that better match that intent.

In another embodiment of the invention, the utility includes an interface with which a content provider can design a custom bubble frame, select the content to appear in the bubble, and generate the code with which to convert a conventional hyperlink into an enhanced hyperlink on its one website. The content provider in the preferred embodiment is an Internet publisher, for example. In one or more embodiments, the publisher specifies the content to be presented in the first area of the bubble while the content displayed in the second area is selected by a host website that provides the bubble development utility. The host may select the content presented in the second area to compliment the first area for the benefit of the end users, i.e., the individuals that visit the publisher's web site.

Figure 1:
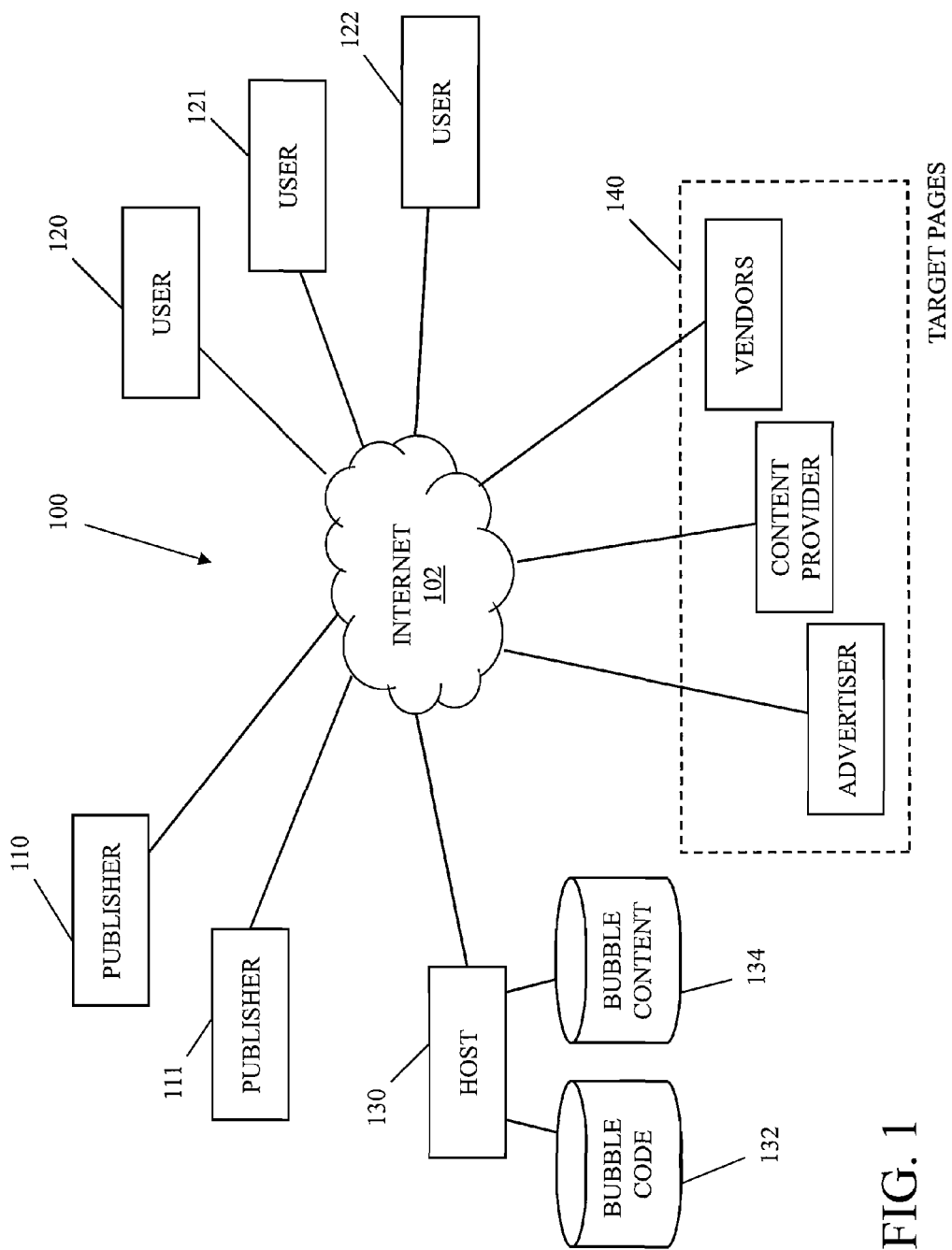
FIG. 1 is a functional block diagram of a data communications network over which a host provides bubble functionality to users viewing published content, in accordance with one embodiment of the present invention.

Illustrated in FIG. 1 is a data communications network 100 for implementing the system and method of the present invention. In the preferred embodiment, the network 100 includes the Internet 102 through which World Wide Web (WWW) resources are transmitted between publishers 110-111 and end users 120-122. The network may further include a host website 130 for facilitating the enhanced hyperlink functionality offered by the publishers to the end users, the host being configured to store computer readable instructions for configuring bubbles on behalf of publishers and a library of bubble content with which publishers can design custom bubbles. As used herein, a website publisher 110-111 refers to a website configured to provide users with Internet content, the Internet content including text and graphics, video, audio, etc. together with hyperlinks that point to or otherwise target other resources at the publishers' own website and/or to point to pages maintained by third party providers. The target web pages 140 pointed to by the publisher hyperlinks may include advertisers, vendors, and other content providers, for example.

Figure 2:
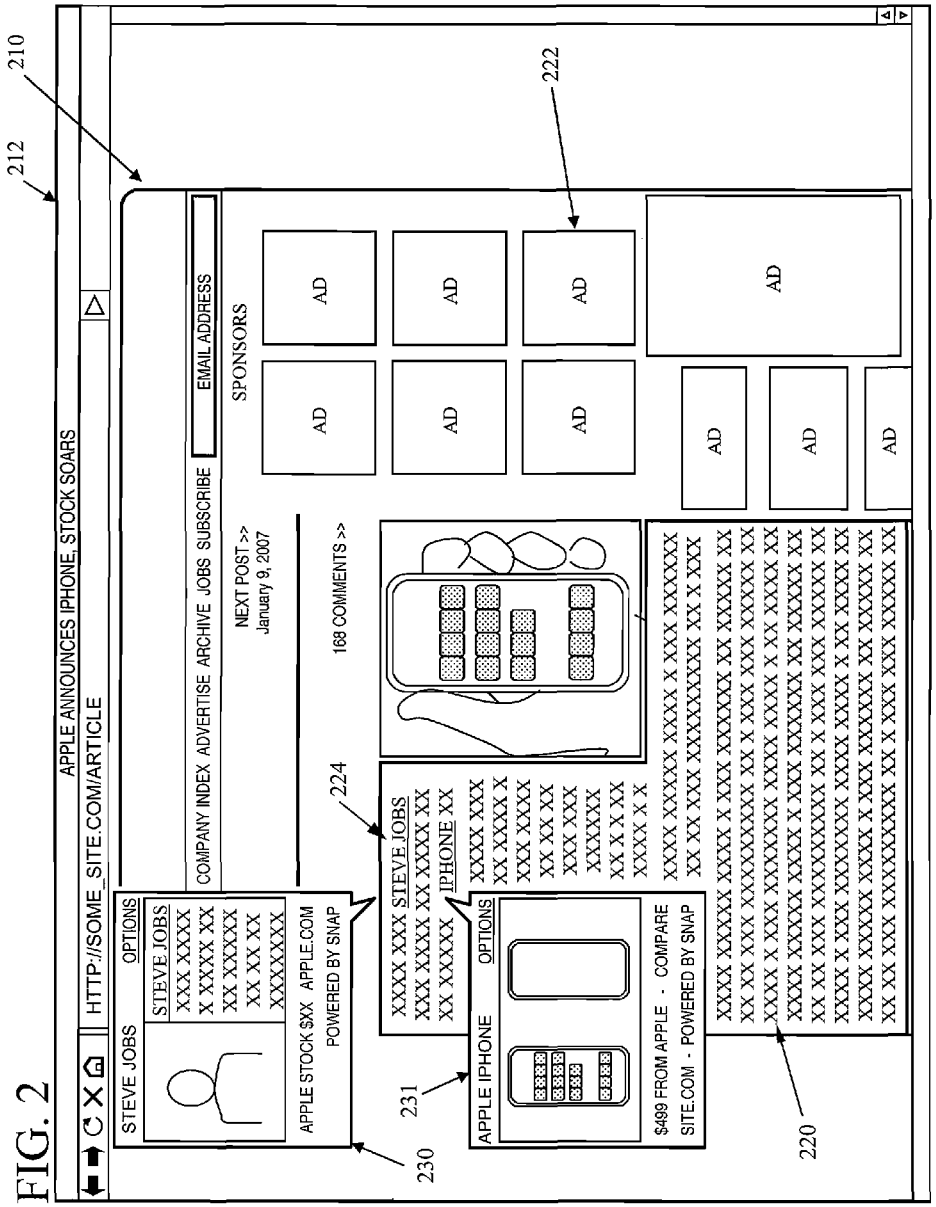
FIG. 2 is a diagrammatic illustration of a user interface showing a web document and two bubbles retrievable from the document, in accordance with one embodiment of the present invention.

Illustrated in FIG. 2 is an exemplary web page with enhanced hyperlinks configured to display bubbles, in accordance with the preferred embodiment of the present invention. The web page 210 in browser frame 212 includes a news article 220 with text and graphics to the left and advertisements 222 by the publisher's sponsors to the right. The article and advertisements are defined using a computer-readable language such as the hypertext mark-up language (HTML). The article 220 includes a number of hyperlinks embedded inline with the text of the article, the links being indicated by colored font with or without a single underline. In accordance with the present invention, the article also includes enhanced hyperlinks configured to provide dual functionality. In particular, an enhanced hyperlink for displaying a bubble 230 when an end user executes a bubble invocation operation. In the preferred embodiment, a bubble is invoked when the user's pointing device guides a cursor to the enhanced hyperlink where the user hovers over or right-clicks the enhanced hyperlink, for example. In FIG. 2, a first bubble 230 with biographical information about Steve Jobs is presented when the user hovers over (a.k.a. "mouse-over") a hyperlink to more information about Steve Jobs. A second bubble 231 with information about the iphone (TRADEMARK) is presented when the user hovers over a second enhanced hyperlink with the phrase "iphone."

Figure 3:
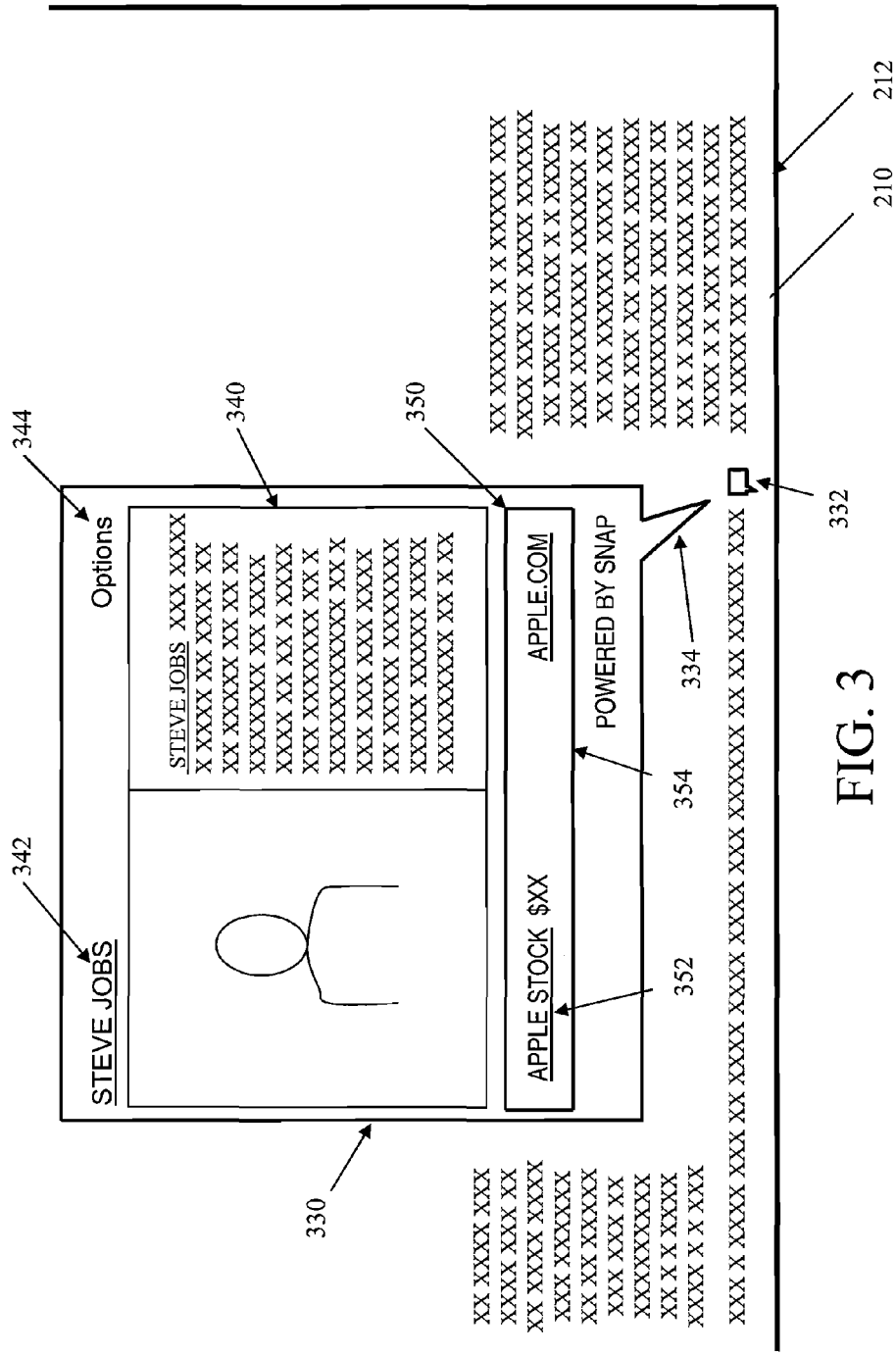
FIG. 3 is close-up view of a diagrammatic illustration of an exemplary bubble over a web document, in accordance with one embodiment of the present invention.
Figure 4:
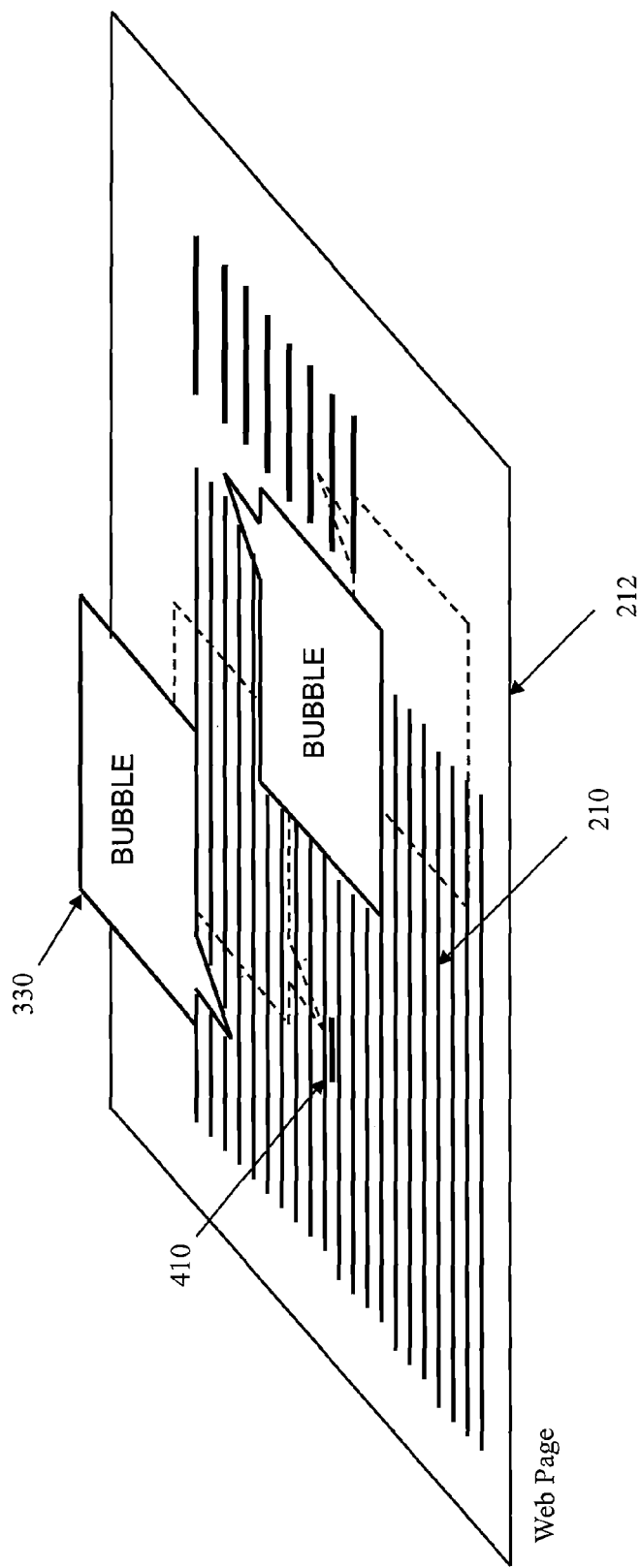
FIG. 4 is a diagrammatic illustration of two exemplary bubbles superimposed over an underlying web document, in accordance with one embodiment of the present invention.

Illustrated in FIG. 3 is a close up view of the article and a bubble. The bubble 330 is associated with an enhanced hyperlink embedded in the text of the article 210. In this embodiment, the bubble 330 is presented when the user hovers over a bubble icon 332, although the bubble 330 may also be invoked when the user hovers over a hyperlink to the phrase "Steve Jobs" as described above when the link is enhanced in the manner described herein. In either case, the bubble that is invoked appears superimposed over the article which, is diagrammatically illustrated in FIG. 4 by bubble 330 next to a hyperlinked phrase 410. The bubble 330 in this exemplary embodiment ceases to appear when the bubble invocation operation ceases to exist, i.e., when the cursor is no longer hovering of the enhanced hyperlink. In some other embodiments, the bubble 330 may ceases to exist after a predetermined period of time has transpired after it is first invoked, or a predetermined period of time after the invocation operation ceases to exist, for example.

The body of the bubble 330 preferably includes a first area 310 and a second area 320. The first area 310 includes text, graphics, video, audio, media, financial information, weather information, cartographic information, encyclopedia information, or a combination thereof generally selected by the publisher of the webpage 210. One or more features in the first area may also be hyperlinked to other target web pages of the same publisher or third parties. In either case, the content displayed in the first area 340 is generally associated with the select words of the article and/or with a target link. In this example, the first area is used to present (a) biographical information about Steve Jobs, (b) a "Steve Jobs" hyperlink 342 with more biographical information, and (c) an options link 344 allowing the user to configure display parameters for the bubble.

The body of the bubble preferably also includes a second area 350. The second area 350 may include text, graphics, video, audio, media, hyperlinks, search field, or a combination thereof generally selected by a host that provides various resources on behalf of the publisher of the webpage 210. In this example, the second area 350 includes a stock quote 352 for Apple Corporation and a hyperlink to www.apple.com 354. The stock quote 353 and hyperlink 354 are both contextually associated with the phrase "Steve Jobs." As one skilled in the art will appreciate, the webpage 210 may be configured so that the bubble 330 is invoked when the user hovers over the word or phrase "Steve Jobs," as was discussed in relation to FIG. 2. In FIG. 3, however, the bubble 330 is invoked when the user hovers over a bubble icon 332 inserted in-line with the text to provide the bubble functionality. The bubble icon, which is not a hyperlink, serves only as a point from which to launch the bubble when the trigger occurs. A bubble icon may be used in proximity to an existing hyperlink (or term) to avoid possible ambiguity between a conventional hyperlink and the enhanced hyperlink discussed herein. In the preferred embodiment, the bubble 330 includes a lead 334 that is configured to appear on the appropriate side of the bubble between the bubble and the associated enhanced hyperlink or bubble icon.

Illustrated in FIG. 5 is a listing of the various exemplary bubbles types employed to display different categories of information to end users. Each type corresponds to a particular format used for the first and second areas of the bubble. The left column includes seven types of bubbles, each tailored to present a given set of files, data, or web pages to end users when invoked. The first is a Wikipedia bubble type 510 specifically tailored to display educational content associated with Wikipedia.org, for example. The second is a Movie or Movie star type 520 tailored to display entertainment content from Imdb.com and movies.yahoo.com, for example. The third is a financial bubble type 530 specifically tailored to display financial content associated with Finance.yahoo.com, moneycentral.msn.com, marketwatch.com, finance.google.com, money.cnn.com, www.investor.reuters.wallst.com, www.cnbc.com, for example. The fourth is a map bubble type 540 specifically tailored to display cartographic content associated with maps.yahoo.com, maps.google.com, mapquest.com, for example. The fifth is a video bubble type 550 specifically tailored to display video content associated with .wmv, .avi, .wma, .mov, .mpg, .ram, .mp4, .mpeg, and .divx files types, for example. The sixth is an audio bubble type 560 specifically tailored to play audio content associated with .mp3, .wav, and .rm file types, for example. The seventh is a weather bubble type 570 specifically tailored to display weather data associated with weather.com, wunderground.com, acuweather.com, .cnn.com/weather, weather.yahoo.com, for example. The list of bubble types presented herein is intended to be a non-exclusive list. One skilled in the art will appreciate that various other bubble types may be implemented without departing from the scope of the invention.

Figure 6A:
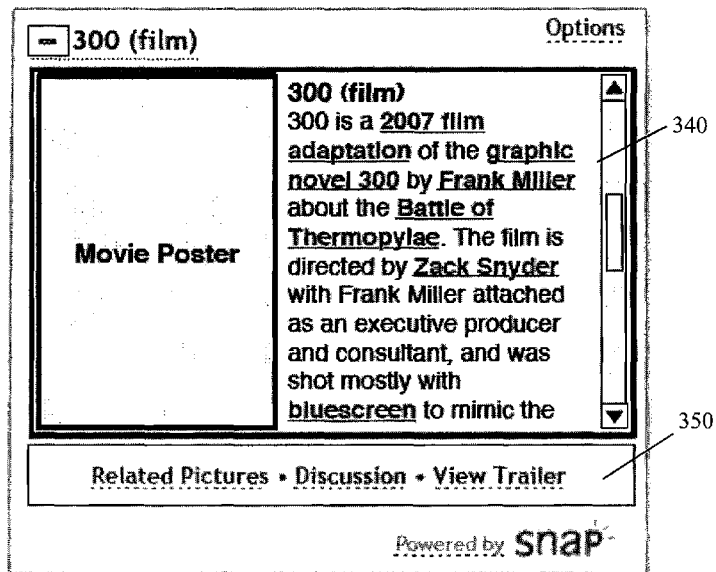
FIG. 6A is an exemplary bubble type for a Wikipedia movie description, in accordance with one embodiment of the present invention.
Figure 6B:
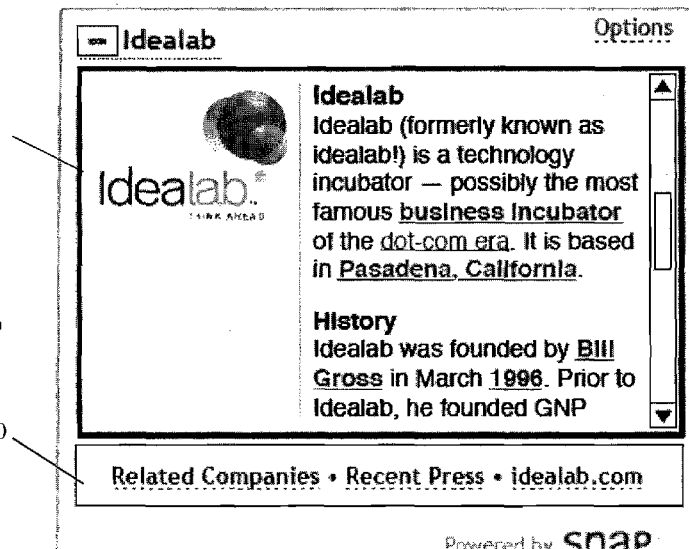
FIG. 6B is an exemplary bubble type for a Wikipedia company description, in accordance with one embodiment of the present invention.

Illustrated in FIGS. 6A-6B are exemplary bubble types used to display a Wikipedia entry for a movie and a company, respectively. In FIG. 6A, the first area 340 of the movie Wikipedia bubble type preferably includes a thumbnail of the movie poster, the name of the film, and a summary including the author the director. The second area 350 includes a "related pictures" link to movies of a similar genre, a "discussion" link to web blogs related to the movie, and a "view trailer" links to play a the studio's movie trailer. In FIG. 6B, the first area of the company Wikipedia bubble type preferably includes a thumbnail of the company logo, the name of the company, a summary of the type of product or service provided by the company, and a brief history of the company. The second area includes a "related companies" link to companies in the same industry, a "recent press" link to news stories about the company or its products, and a link to the company website.

Figure 6C:
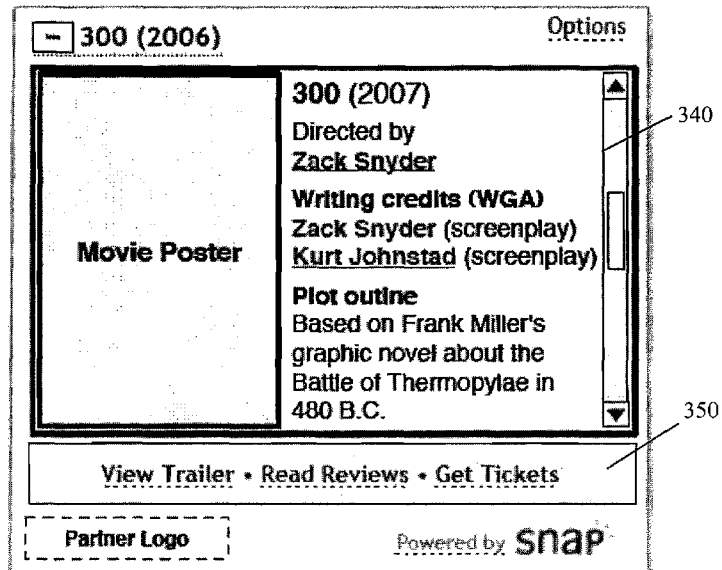
FIG. 6C is an exemplary bubble type for a Wikipedia current movie description, in accordance with one embodiment of the present invention.
Figure 6D:
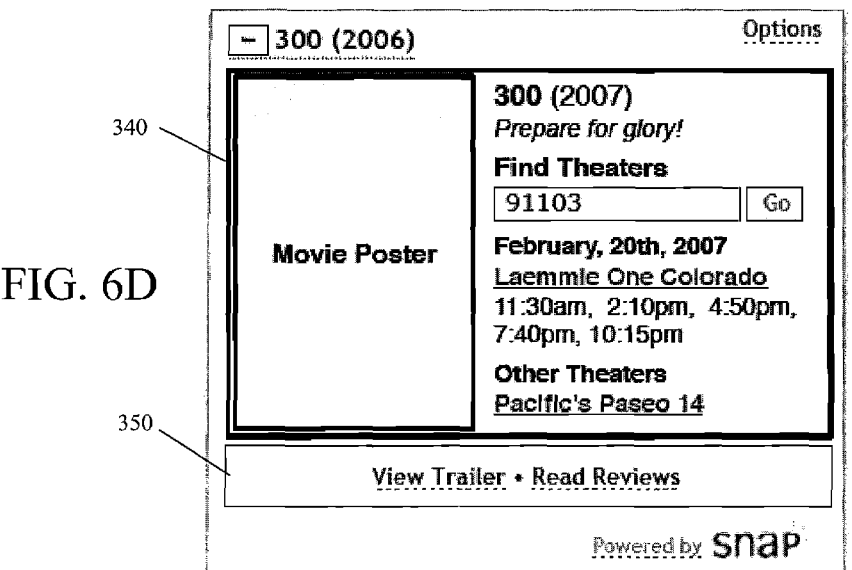
FIG. 6D is an exemplary bubble type for a Wikipedia current movie description, in accordance with one embodiment of the present invention.
Figure 6E:
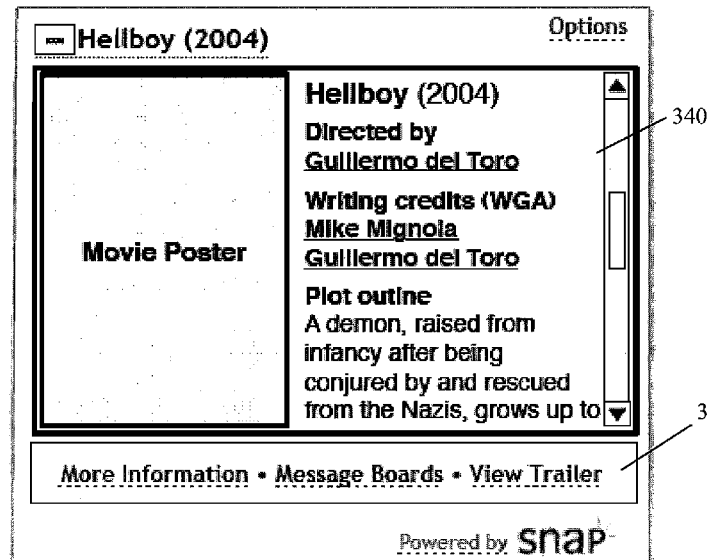
FIG. 6E is an exemplary bubble type for a Wikipedia archived movie description, in accordance with one embodiment of the present invention.

Illustrated in FIGS. 6C-6E are exemplary bubble types used to display movie-related content. FIG. 6C is used to display an abstract with information about a current movie or film. The first area 340 of the movie bubble type preferably includes a thumbnail of the movie poster, the name of the film, the author, the director, and plot summary. The second area 350 includes a "view trailer" links to play a the studio's movie trailer, a "read review" link to see a movie rating, and a "get tickets" link to look up play times and purchase movie tickets. FIG. 6D is an alternative template used to display an abstract with information about a current movie or film. The first area of the movie bubble type preferably includes a thumbnail of the movie poster, the name of the film, the author, and theater information including one or more links to local theaters and the times that the movie is showing. The names of the local theaters may be determined from a zip code entered by the user into a form field in the bubble. Thereafter, the information that is selected for the abstract displayed in the first area is based on the context in which the associated hyperlink appears and/or the target URL embedded in the hyperlink. The selected information for this bubble or other bubbles discussed herein may be retrieved from one or more sources which may or may not include target web page. The second area includes a "view trailer" links to play the studio's movie trailer and a "read review" link to see a movie rating.

FIG. 6E is used to display an abstract with information about a past movie or film no longer in the theaters. In this exemplary embodiment, the first area of the movie bubble type preferably includes a thumbnail of the movie poster, the name of the film, the author, the director, and plot summary. The second area includes a "more information" link, a "message board" link to see discussions of the movie, and a "view trailer" links to play the studio's movie trailer if available.

Figure 6F:
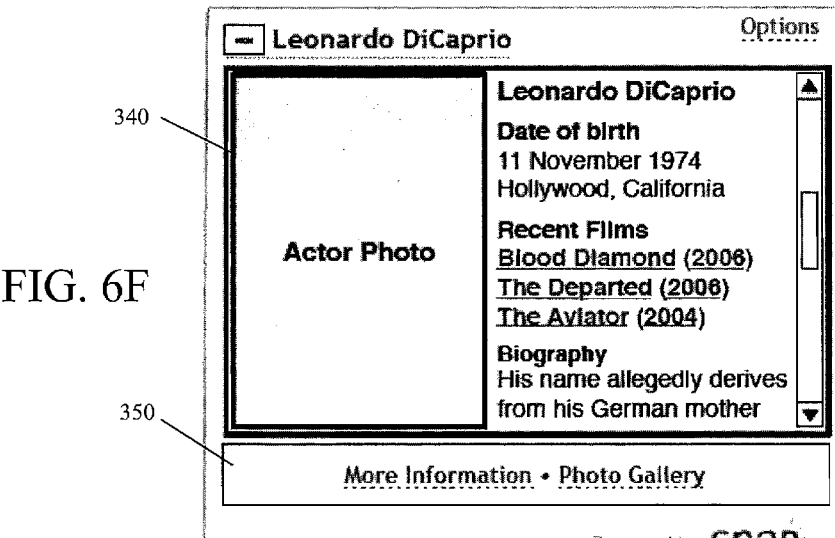
FIG. 6F is an exemplary bubble type for a Wikipedia actor description, in accordance with one embodiment of the present invention.

FIG. 6F is used to display an abstract with information about a particular actor. In this exemplary embodiment, the first area of the movie bubble preferably includes a thumbnail of the actor, the actor's name and date of birth, movies that the actor has appeared in recently, and other biographic information. The second area includes a "more information" link and a link to a photo gallery of actor pictures.

Figure 6G:
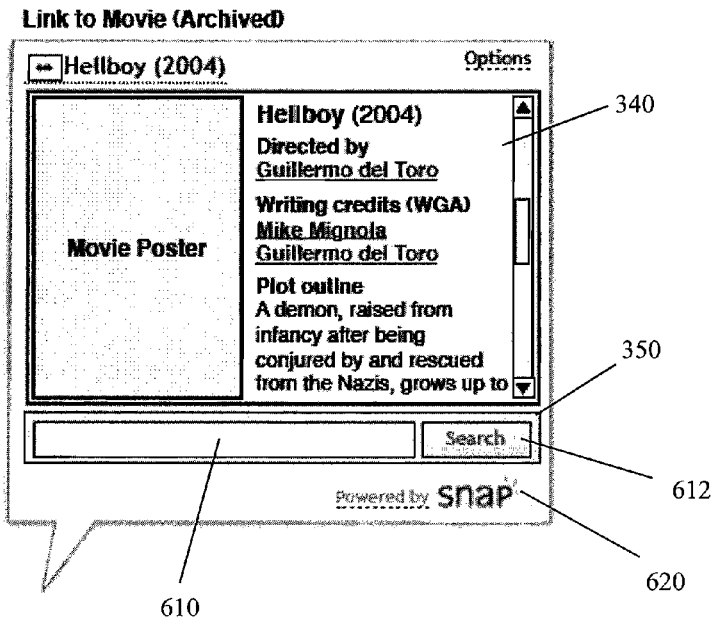
FIG. 6G is an exemplary bubble type for a Wikipedia archived movie description, in accordance with one embodiment of the present invention.

FIG. 6G is used to display an abstract with information about a past movie or film no longer in the theaters, although the first area may include current movie information described above. In contrast to FIG. 6E, the second area in this embodiment includes one or more form fields such as the text box 610. The text box is configured to receive one or more keyword phrases from the user, submit the keywords to an Internet search engine identified by the logo 620 when the search command button 612 is depressed, and return a plurality of search results hyperlinked to relevant websites. The search results may be presented to the end user in the bubble 330, in the original web page 210, or in a new browser frame. In addition to the text box 610, the host/search engine may also incorporate one or more "suggested searches" in hyperlink form in the second area. A suggested search is a combination of one or more predefined keywords which, when selected by the user, invoke a search at the host/search engine as if the user had entered the keywords in the text box 610. Suggested searches are generally selected based on prior user search behavior and/or the context determined based on the web page in which the enhanced hyperlink appears, the context of the target of the hyperlink, or a combination thereof.

Figure 6H:
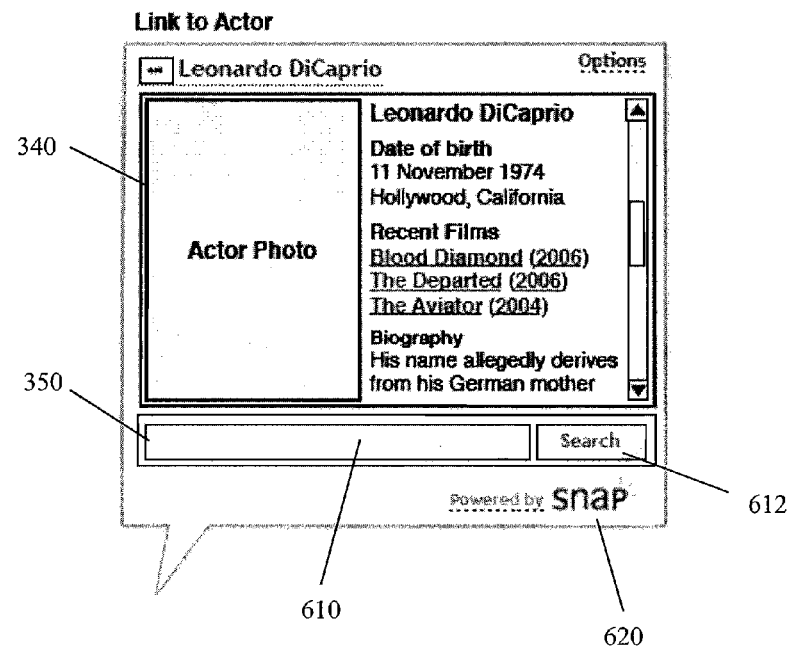
FIG. 6H is an exemplary bubble type for a Wikipedia actor description, in accordance with one embodiment of the present invention.

FIG. 6H is used to display an abstract with information about a particular actor consistent with that described above in FIG. 6F. In contrast to FIG. 6F, however, the second area in this embodiment includes one or more form fields such as the text box 610. The text box is configured to receive one or more keyword phrases from the user, submit the keywords to an Internet search engine identified by the logo 620 when the search command button 612 is depressed, and return a plurality of search result listings hyperlinked to relevant websites. The list of search results may be presented to the end user in the bubble 330, in the original web page 210, or in a new browser frame. In addition to the text box 610, the host/search engine may also incorporate one or more "suggested searches" in hyperlink form in the second area.

Figure 7A:
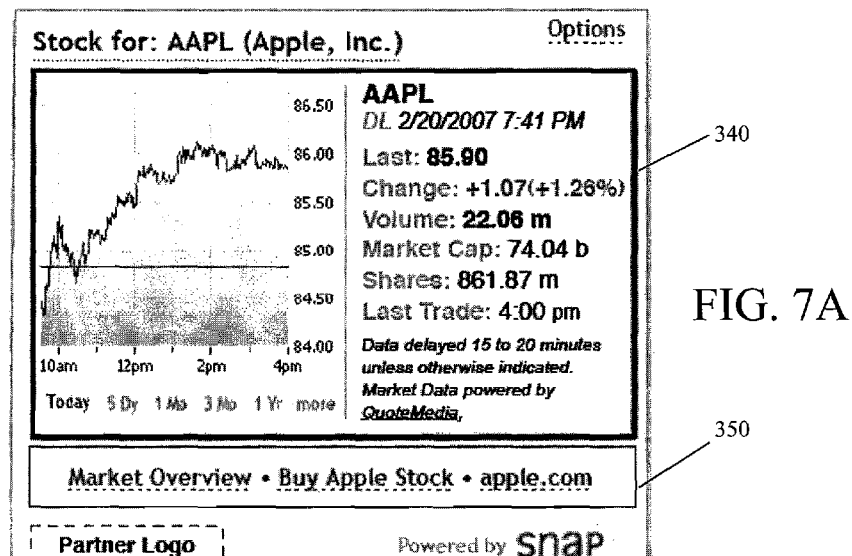
FIG. 7A is an exemplary bubble type for stock pricing and other financial information, in accordance with one embodiment of the present invention.

FIG. 7A is a bubble type used to display company financial information. The first area includes a chart or other graphic of the company stock price over a determined period of time, the ticker symbol for the company, the price of the last stock purchase, the percentage change of the stock price from the closing price the business day before, the volume exchanged that day, the market capitalization, number of shares, and time of last trade. The second area includes a "market overview" link for abstract of the days financial events, a "buy <company_name> stock" link enabling the user to initiate the purchase of company stock, and a link to the company website. This embodiment of the bubble further includes a third area at the bottom of the bubble to provide attribution for the host website as well as the source of the chart using name/logo information.

Figure 7B:
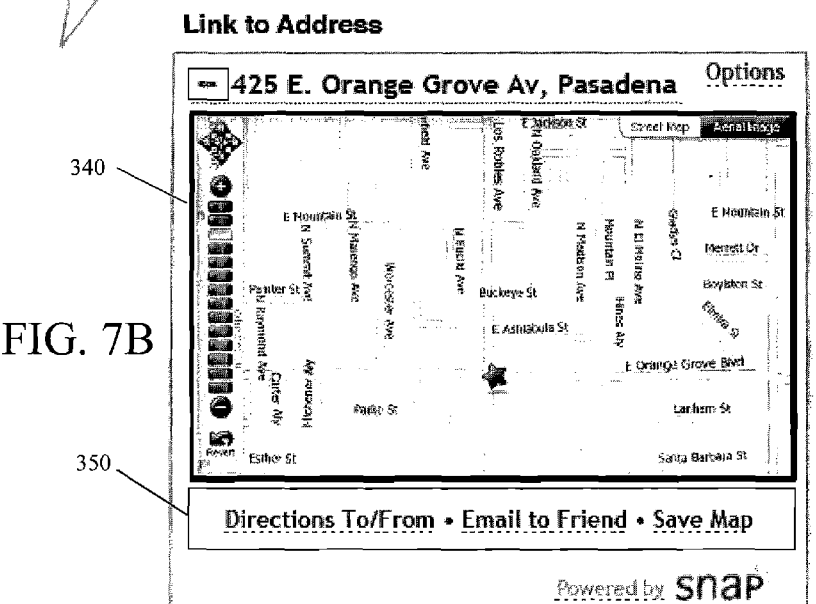
FIG. 7B is an exemplary bubble type for a map, in accordance with one embodiment of the present invention.

FIG. 7B is a bubble type used to display cartographic information, e.g., street map graphics. The first area at the top of the bubble includes a map of an address sought by the user. The first area also includes tabs that that enable the user to change the scale or size of the map (i.e., zoom-in or zoom-out), change the size of the bubble in which the map is displayed, or a combination thereof. The second area includes a "directions to/from" link allowing the user to get turn-by-turn instructions between two locations, an "email to friend" link allowing the user to forward the map by email, and "save map" link.

Figure 8A:
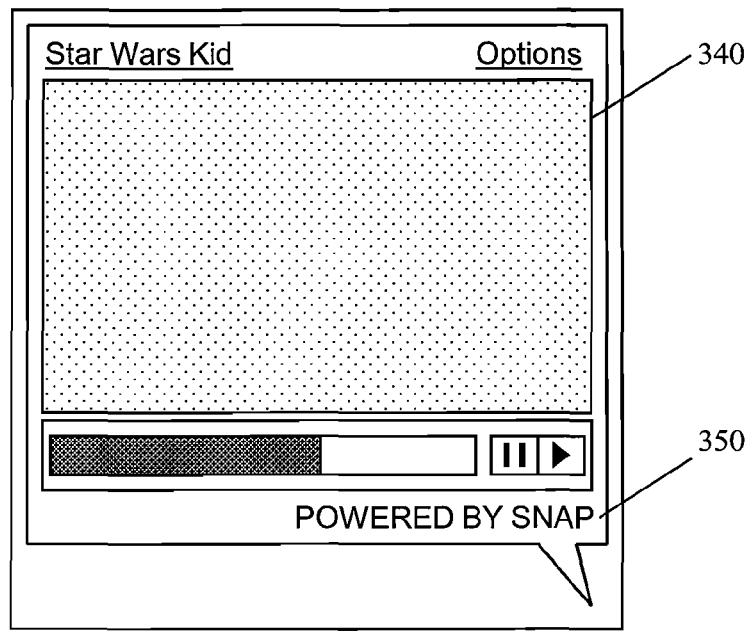
FIG. 8A is an exemplary bubble type for video and player application, in accordance with one embodiment of the present invention.

Illustrated in FIG. 8A is an exemplary bubble type used to present videos to users. The first area includes a display area sized to accommodate the video feed. In the preferred embodiment, the video is automatically played for the user as soon as practicable after the bubble is invoked. A player application is select based on the file type and launched with the bubble to play the video. The bubble may further include a bar showing what percentage of the video has played as well as control buttons to play and pause the video.

Figure 8B:
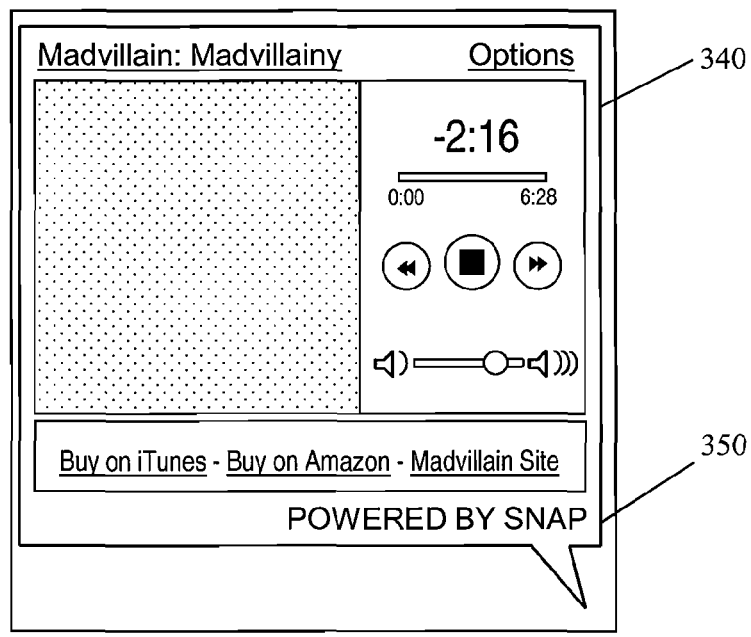
FIG. 8B is an exemplary bubble type for audio and player application, in accordance with one embodiment of the present invention.

Illustrated in FIG. 8B is an exemplary bubble type used to present audio files to users. The first area is configured to display an album cover, for example. In the preferred embodiment, the audio file is automatically played for the user as soon as practicable after the bubble is invoked. A player application is select based on the file type and launched with the bubble to play the audio file. The bubble may further include a bar showing what percentage of the file has played as well as control buttons to play and pause the file.

Illustrated in FIG. 9A is an exemplary bubble type used to present consumer product information to users. The first area of the bubble preferably includes an abstract of information with one or more images of a product, a description of the produce, the price of the product, a review of the produce, and a hyperlink to the manufacture's website where the product can be purchased. The first area may also include a scroll bar (controlled by "<" and ">" icons shown) enabling the user to view bubble content outside the physical boundary of the bubble frame. The second area of the bubble preferably includes a one or more links to retailers that sell the product depicted in the first area, as well as a "compare others" hyperlink to a website that compiles pricing information of a plurality of retailers. For attribution, the second area may further include the names and/or logos of the host and the source of product information shown in the first area.

Illustrated in FIG. 9B is an exemplary bubble type used to present news to users. In the preferred embodiment, the abstract of the news is provided through an agreement with the news website. The abstract of the news may be selected and provided by the news website, or the extracted from the news website by parsing the text of select pages of the news website. The second area may include one or more form fields including a search engine text box 910 and search command button 912 used by the user to execute an Internet search of the World Wide Web or of the particular news website.

Figure 9C:
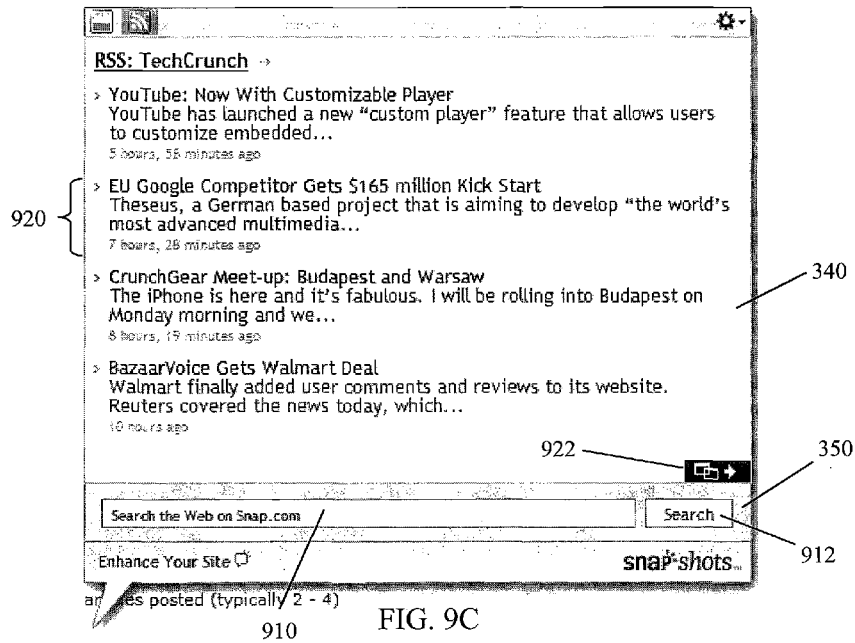
FIG. 9C is an exemplary bubble type for an RSS feed, in accordance with one embodiment of the present invention.
Figure 9D:
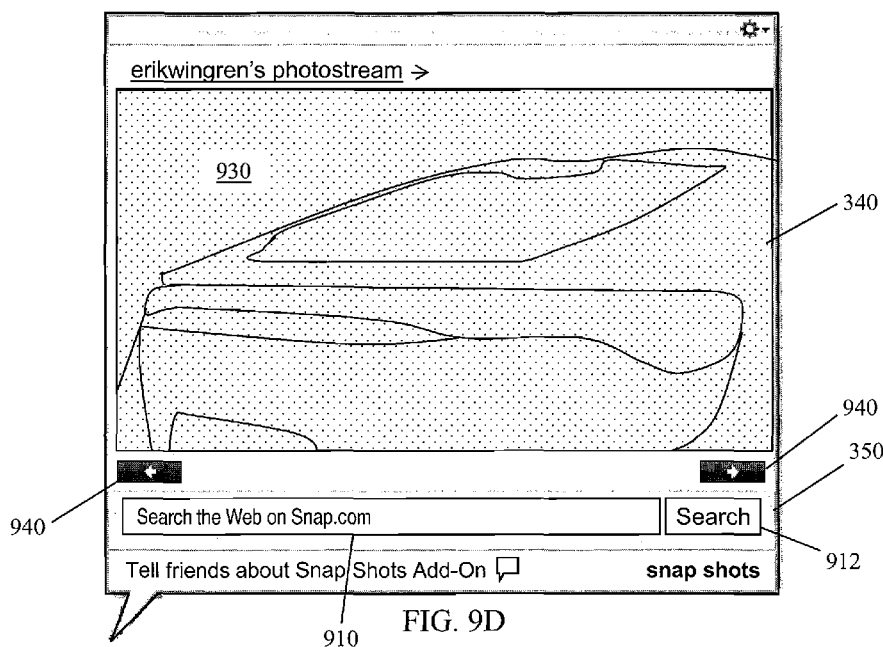
FIG. 9D is an exemplary bubble type for a photo gallery, in accordance with one embodiment of the present invention.

FIG. 9C is an exemplary bubble type for a Really Simple Syndication (RSS) feed. The RSS bubble is configured to automatically display in the first area 340 the RSS feed of any site that publishes a feed. The publishers' updates are delivered to the host 130 which then automatically formats the content for the RSS bubble so that it may be displayed the next time a user hovers over the enhanced hyperlink. If the RSS feed is a partial feed, the first area of the RSS bubble may summarize one or more articles, each summary 920 consisting of a headline linking back to the publisher website where the article resides, a short summary of the article content, and an elapse timestamp indicating how long ago the article was posted. The RSS bubble therefore allows a user get a quick, text summary of another site's current content without leaving the current site having the enhanced hyperlink. In the case of a full RSS feed, the RSS bubble may provide access to a full feed with an entire article available through the bubble. In some embodiments, the RSS bubble may also be configured to present a preview of the partial feed, the preview being an image of the target web page depicting the summaries of updated content. An "view select icon" 922 may also be used to toggle between two or more alternate views of the RSS content, e.g., toggle between (a) actual summaries of one or more articles and (b) a preview image of the target page with the one or more summaries. The RSS bubble also includes a second area 350 which may include one or more form fields such as a search engine text box 910 and search command button 912 used by the user to execute an Internet search of the World Wide Web or of the particular news website FIG. 9D is an exemplary bubble type for presenting a single photo or an interface for sequentially viewing each of a plurality of photos in a gallery, for example. In the latter case, the first area of the bubble preferably includes a thumbnail of one of the plurality of pictures as well as navigation buttons 940 that permit the user to select and display the preceding image or next image in the gallery. The photo bubble also includes a second area which may include one or more form fields such as a search engine text box 910 and search command button 912 used to execute an Internet search of the World Wide Web or other website.

In some embodiments, one or more of the bubble types are configured with an active title bar which, when clicked on, configures the bubble to persist even after the cursor has moved away from the enhanced hyperlink or bubble icon from which the bubble was invoked. Sometimes referred to as "pinning," the bubble is to made to persist to allow the user the option of returning to the bubble at a later time or allowing a player application to continue playing a media file. If the user invoked an audio file and began playing a song, for example, the user could click on the title bar which would cause the song to continue playing even after the user has moved the cursor away form the enhanced hyperlink and activated another window. The bubble is only removed after the user closes the bubble.

In some embodiments, one or more of the bubble types are configured with "resize icon" with which the user can alternate between two different sizes of the bubble. The first bubble invoked by the user is one size. If desired, the user can click on the resize icon which causes the bubble to be rendered again only larger. Depending on the implementation, the content in the first area may be held at the same scale and the amount of content increased, or the content in the first area enlarged so that text/graphics appear larger.

Figure 16:
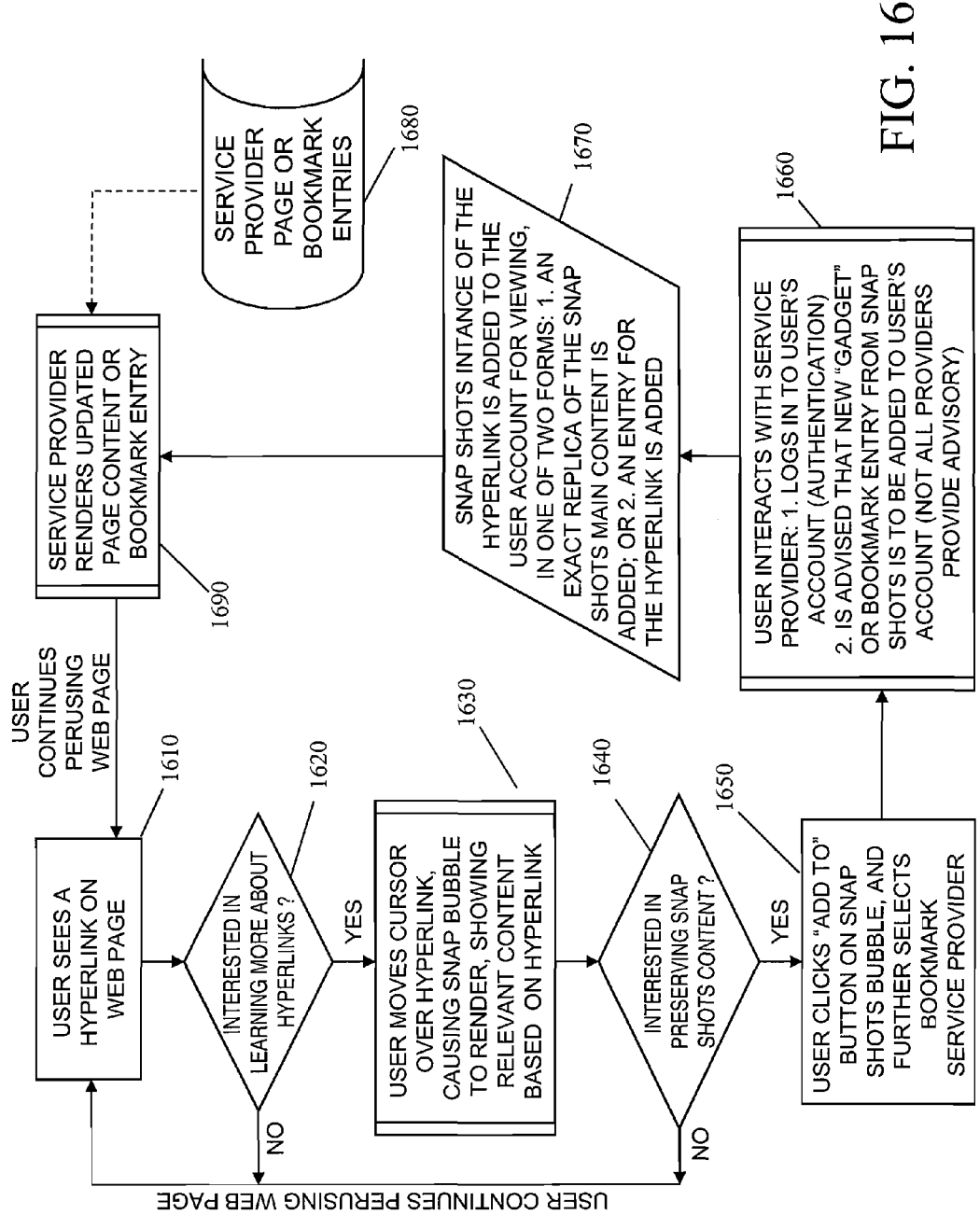
FIG. 16 is a flowchart of the method by which a bubble is bookmarked, in accordance with one embodiment of the present invention.

One or more of the bubble types listed above may include a bookmark icon enabling the user to store a link to the bubble for later use. FIG. 16 includes a flowchart of the method by which a bubble is bookmarked. When a user views 1610 a web page with enhanced hyperlinks, the user may demonstrate 1620 an interest in the enhanced hyperlink by hovering the cursor over the hyperlink, for example, to invoke 1630 the associated bubble. When the bookmark icon is available in the title bar, a user interested in retaining 1640 a copy of the bubble can initiate an "Add to" command through a pull-down menu, for example, to select a bookmark service provider. Examples of bookmark service providers include iGoogle, Del.icio.us, and StumbleUpon. Depending on the implementation of the selected provider, the user (a) may be prompted 1660 with a request for the user's account information for authentication purposes, and (b) may be advised that a new bookmark or "gadget" for the bubble is to be added to the user's account. Thereafter, a bookmark entry is added to a listing of bookmarks so that the bubble can be invoked at a later time, or an instance of the bubble with a replica of the original content is added 1670 to the user account for viewing.

Figure 17:
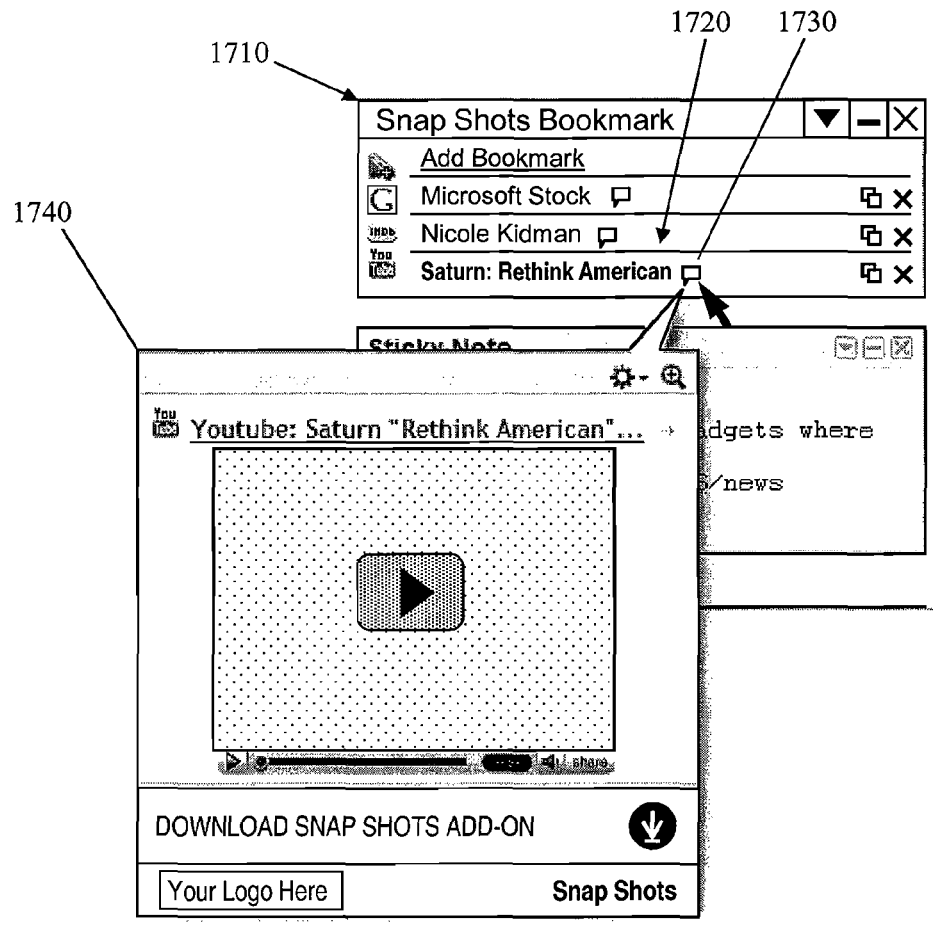
FIG. 17 is a screen shot of a bookmark gadget and a bubble invoked directly from a bookmark, in accordance with one embodiment of the present invention.

Referring to FIG. 17, the bookmark in some embodiments includes a conventional hyperlink 1720 that is saved with a bookmark gadget 1710, for example. The bookmark 1720 may further include a bubble icon 1730 configured to invoke the corresponding bubble 1740 when the user hovers over the icon 1730 listed in the gadget without the user necessarily clicking on the saved bookmark. In other cases, the hyperlink to the bubble may be added as a new gadget to the customized homepage presented to the user, thereby making the bubble appear on the user's homepage along with other gadgets (e.g., weather gadget, clock gadget, and news feeds gadget) when the service provider renders 1680 the updated homepage.

Figure 10:
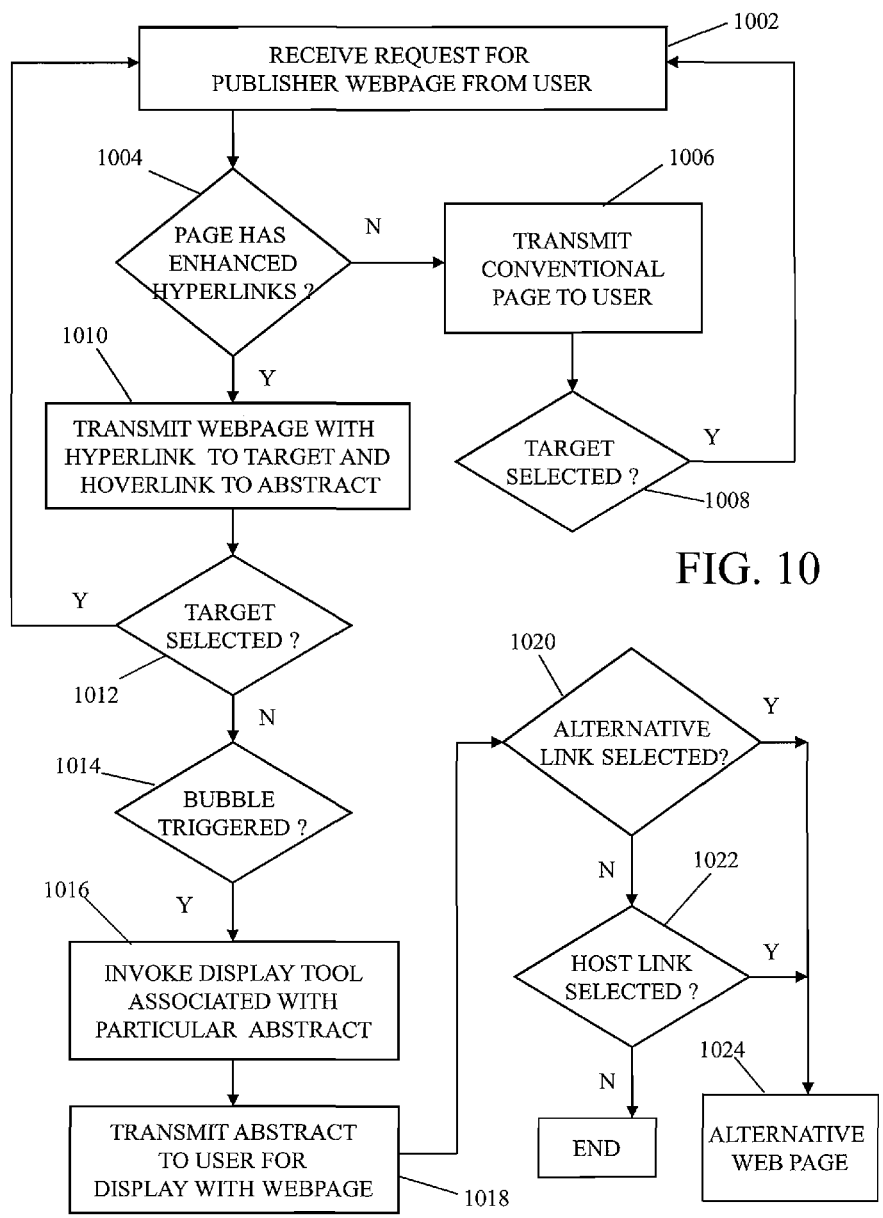
FIG. 10 is a flowchart of the method by which a publisher provides abstracts and/or media with interactive content to end users with the enhanced hyperlink functionality, in accordance with one embodiment of the present invention.

Illustrated in FIG. 10 is a flowchart of the method by which a publisher provides abstracts and/or media with interactive content to end users with the enhanced hyperlink functionality. When an end user navigates to a publisher website, the publisher transmits a splash page or other landing page to the user. If the particular web page consists of conventional hyperlinks, the conventional HTML page is transmitted 1006 to the user. If the web page includes one or more enhanced hyperlinks with bubble functionality, the decision block 1004 is answered in the affirmative and the webpage transmitted 1010 to the user with enhanced hyperlinks, each enhanced hyperlink configured to point to a target page if clicked and invoke to a bubble if hovered over. In the preferred embodiment, the webpage further includes an HTML tag configured to draw down a set of computer readable code from a database 132 at the host website 130 (see FIG. 1). The code is used to at least (1) recognize when the cursor hovers over an enhanced hyperlink, and (2) identify the appropriate bubble style parameters and bubble content to be downloaded when the bubble is triggered. By maintaining the bubble code in a central location, the host can reduce the bandwidth needed by multiple publishers 110-111 to send bubble code to their end users 120-122.

If the end user clicks on the enhanced hyperlink (including bubble icons), decision block 1012 is answered in the affirmative and the user directed to another publisher webpage, for example, specified by the URL in the tag. If the user makes a gesture that triggers the bubble, e.g., causing the cursor to hover over 1016 the enhanced hyperlink, the bubble with abstract/media information is retrieved from the publisher or host 130, for example, and transmitted to the user. The style of the bubble frame, including its size and shape, are preferably identified in the computer readable code embedded in the webpage having the enhanced hyperlink. Depending on the type of bubble content or media information, the computer readable code that configures the bubble may further include instructions for invoking a display tool or player application for automatically presenting the content to the user. If the content can be classified, into one of the plurality of categories in FIG. 5, the bubble will be automatically configured to present the content using the corresponding template shown in FIGS. 6-9.

As discussed above, the bubble presented to the user generally includes hyperlinks in the first area, the second area, or a combination thereof. The hyperlinks presented in the bubble are provided as alternatives to the target web page associated with the hyperlink. If an alternative hyperlink in the first area of the bubble is selected, decision block 1020 is answered in the affirmative indicating that the user has navigated 1024 to an alternative web page within the publisher website or external website. If an alternative hyperlink in the second area of the bubble is selected, decision block 1022 is answered in the affirmative indicating that the user has navigated 1024 to a web page within the host website or some other external website.

In some embodiments, the computer readable code inserted into the body of a webpage with enhanced hyperlinks further includes code that permits the user to selectively enable or disable the bubble functionality. If the user disables the bubbles, for example, the bubble will not be invoked or displayed when the user hovers over an enhanced hyperlink.

Figure 11:
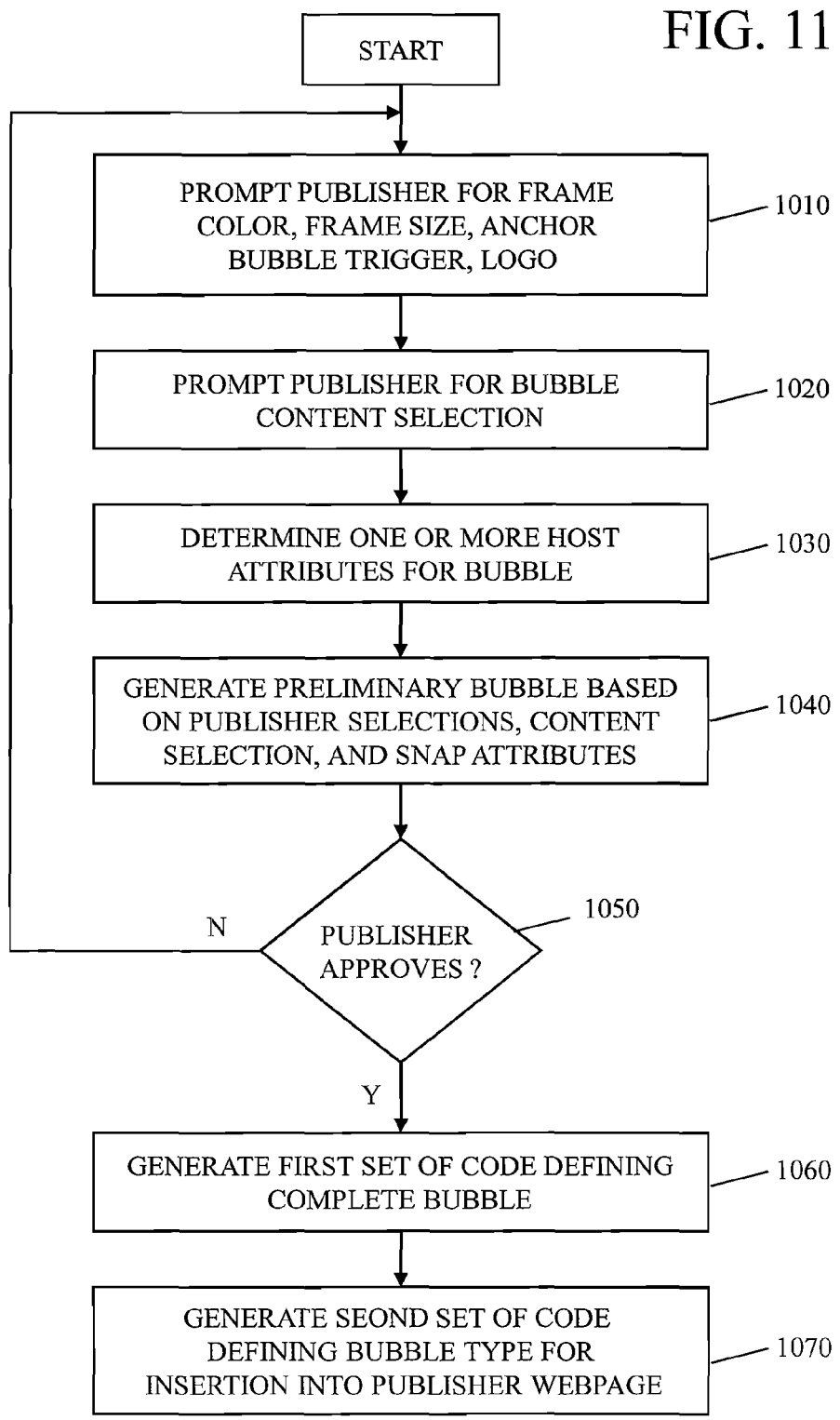
FIG. 11 is a flowchart of the method by which a publisher configures a web page with enhanced hyperlinks, in accordance with one embodiment of the present invention.
Figure 12:
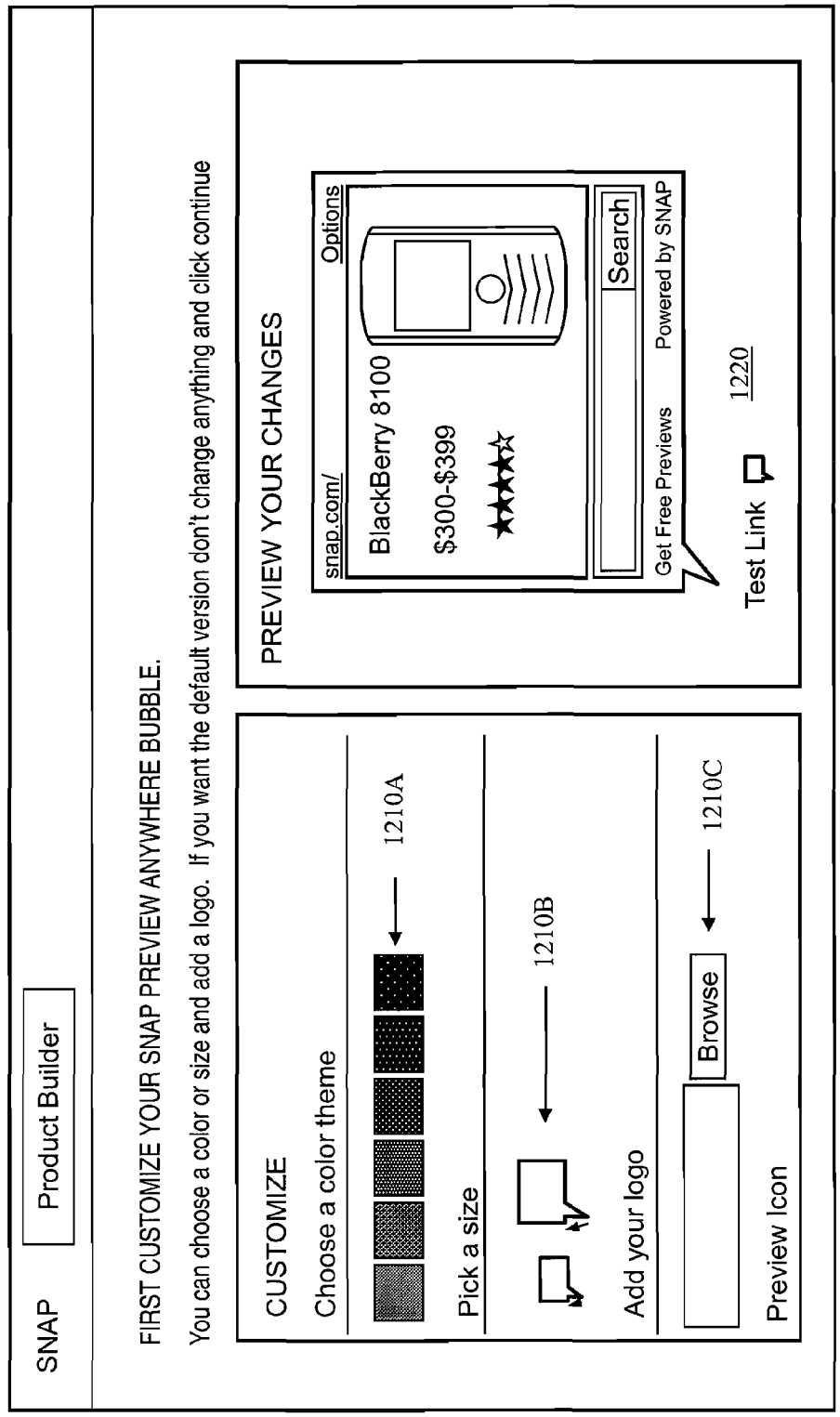
FIG. 12 is an interface through which a publisher can access the host server and select and configure a bubble for use with its content, in accordance with one embodiment of the present invention.

Illustrated in FIG. 11 is a flowchart of the method by which a publisher configures a web page with enhanced hyperlinks. In this embodiment, the host provides an interface with which publishers can conveniently design bubbles for inclusion in their web pages. An exemplary interface is shown in FIG. 12. In the first step 1010 in FIG. 11, the host prompts the publisher to select a bubble frame color from a selection of colors 1210A, select a bubble frame size from a plurality of sizes 1210B, specify the anchor text or graphic that triggers the bubble when hovered over, and input the publisher's logo for insertion in the bubble using the path form field and browse button 1210C. The anchor associated with the bubble may include text, graphic, or bubble icon described above. In the case of text, the publisher can specify whether the enhanced hyperlink is signified with no underline, single underline, or double underline, for example.

The interface also prompts 1020 the publisher to specify the content to be displayed in the first area of the bubble. The content may be designed by the publisher and uploaded to the host website. In the alternative, the publisher may select from a library of preformatted, pre-approved content maintained in a bubble content library 134. Based on the anchor text and content in the first area, for example, the host may also determine what content to display in the second area of the bubble.

Once the content for first area and second area of the bubble are selected, a preliminary version of the bubble is generated 1040 and presented 1220 to the publisher in the right side of the interface. The steps described above may be repeated if the publisher fails to approve the appearance of the bubble. If the publisher approves the bubble 1220, decision block 1050 is answered in the affirmative and the host generates 1060 a first set of computer readable instructions that is retained in a bubble code database 132. The first set of code refers to the HTML code (described above) transmitted to the user to configure the bubble in the browser window when invoked by the end user. In some embodiments, the host also generates 1070 a second set of computer readable instructions which, when inserted in the publishers webpage, retrieve the code defining one of the plurality of the bubbles from the host website. As one skilled in the art will appreciate, the code for one of the bubbles types can be retrieved from the host website by adding a class attribute between the div and span tags where each class defines the size, shape, and content of one of the unique plurality of bubble types.

Figure 13:
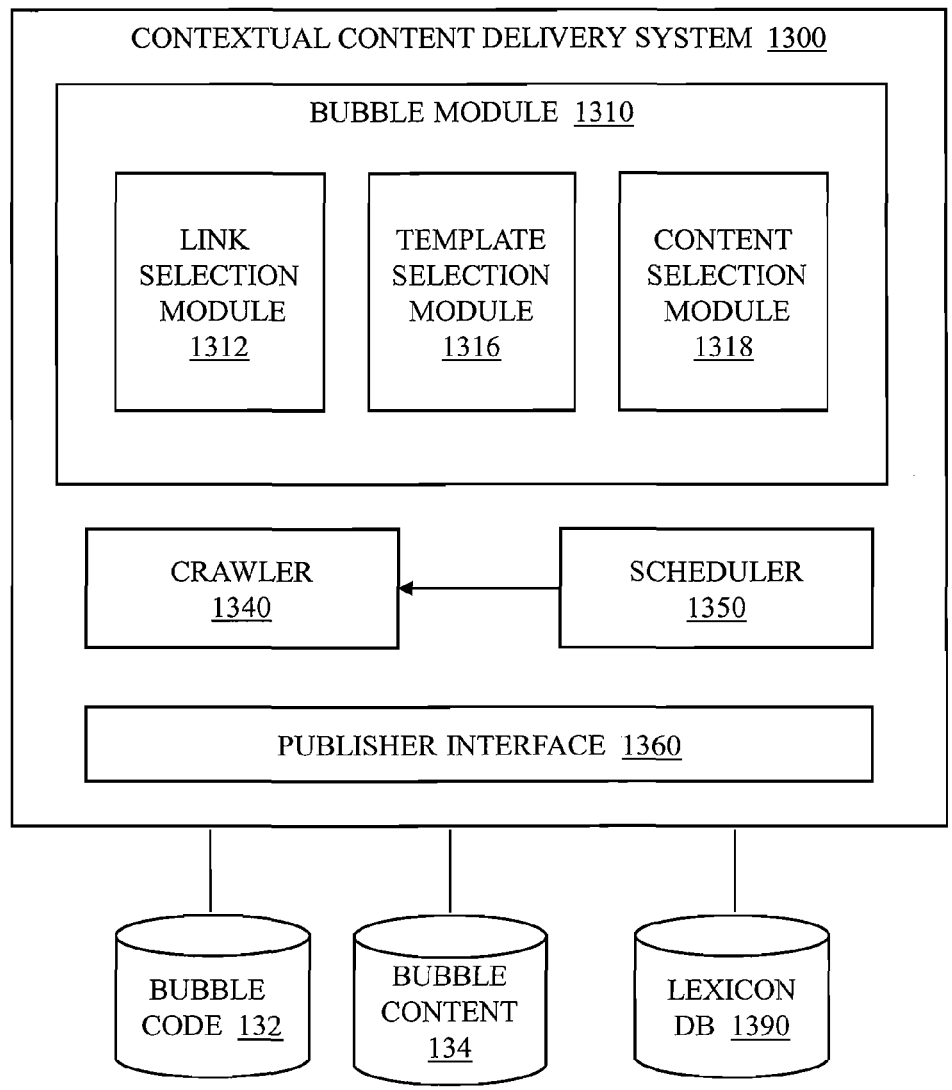
FIG. 13 is a functional block diagram of the contextual content delivery system, in accordance with one embodiment of the present invention.

Illustrated in FIG. 13 is another embodiment of the present invention. In this embodiment, the host—referred to as the contextual content delivery system (CCDS)—is configured to determine the content to be displayed in a bubble based on the context in which the bubble is invoked. The CCDS 1300 can also automatically convert a publisher page to provide the bubble function with little or no human intervention. That is, the CCDS 1300 of the preferred embodiment is configured to scan web content and determine whether to add bubble link functionality to existing hyperlinks or to text of a page not previously hyperlinked.

Referring to FIG. 13, the CCDS 1300 is a server-side software system that includes a module 1310 responsible for various aspects of bubble functionality, a crawler 1340 for periodically updating web content used in connection with the bubbles based on a scheduling tool 1350, and an interface 1360 through which publishers, advertisers, and other parties may participate by identifying web pages to be enhanced with bubble functionality or submitting bids/offers advertising links and content.

The bubble interface 1310 preferably includes a module configured to scan a document or webpage identified by a publisher for purposes of determining the content from which a bubble may be triggered and the content of that bubble. The link selection module 1312 may add a bubble to one or more unlinked words or phrases in a web page, or convert one or more conventional hyperlinks to enhanced hyperlinks, or a combination thereof. When scanning a document for standard HTML text and graphics content, for example, the CCDS 1300 selects which elements to link using the method described below. When converting conventional links to enhanced hyperlinks, the CCDS 1300 determines the character of the link and its context for purposes of determining the type of bubble and suitable bubble content.

If a publisher elects to have it's Internet content enabled with bubble functionality, the URLs to the publisher's content are submitted to the CCDS 1300 which then scans the documents. For each document, the link selection module 1312 initially extracts terms representing key concepts from the web page, selects the least ambiguous terms from the extracted terms, and compares the set of least ambiguous terms to known terms in a lexicon database 1390. The lexicon database 1390 includes a plurality of words and phrases as well as a listing of the corresponding documents and links that are most closely associated with that word or phrase. The corresponding documents and links may include paid advertisements which, when presented to the user or clicked on by the user may generate revenue that triggers a charge to the advertiser that helps to underwrite the expense of the bubble functionality. The association between word/phrase and relevant documents/words can be made through a combination of automation and human editors. A predetermined number of words/phrases that best represent the context of the publisher's document are selected and enhanced with a bubble link. The bubble may then be invoked when the user's pointing device hovers over the word, or hovers over a bubble icon that is inserted in-line with each of the selected words. The selection process by which contextually-relevant words and phrases are identified may be based, in part, on metrics including the click-through rate (CTR) and/or the product of the CTR and revenue per thousand page views (RPM). In the preferred embodiment, the keyword selection process is automated using a software application at the CCDS 1300.

If the CCDS 1300 is configured to convert the conventional hyperlinks of a document into enhanced hyperlinks, then the CCDS scans the web page to identify links and the resource to which those links point. The CCDS 1300 selects the most appropriate type of bubble based on the type of resource, and then populates the bubble with content that represents the context. Illustrated in FIGS. 14A and 14B is the method by which the template selection module 1316 of the CCDS 1300 selects the bubble type.

Figure 14A:
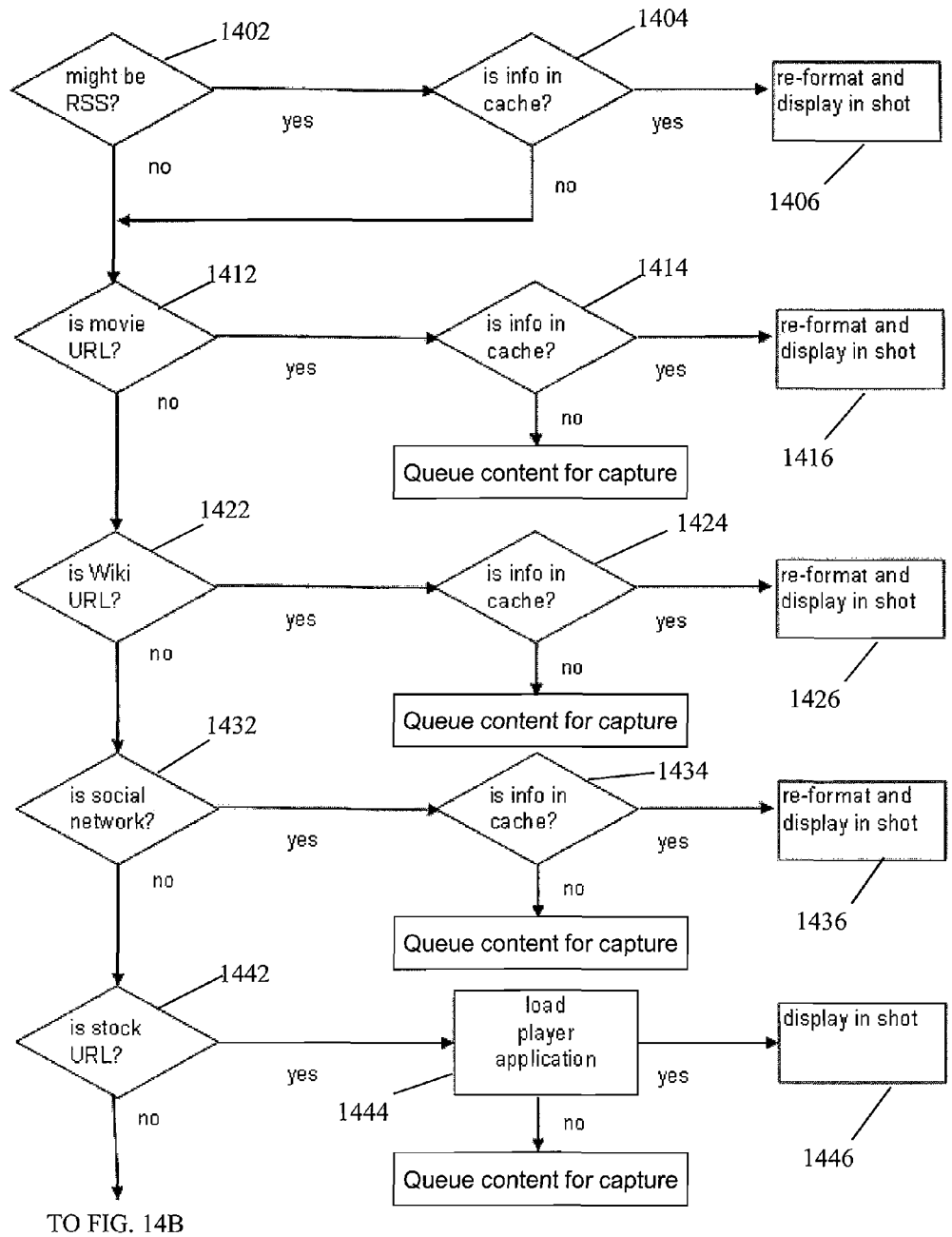
FIGS. 14A and 14B is a flowchart of the method by which a suitable bubble type is select for use with a hyperlink, in accordance with one embodiment of the present invention.
Figures 14A, 14B, 15:
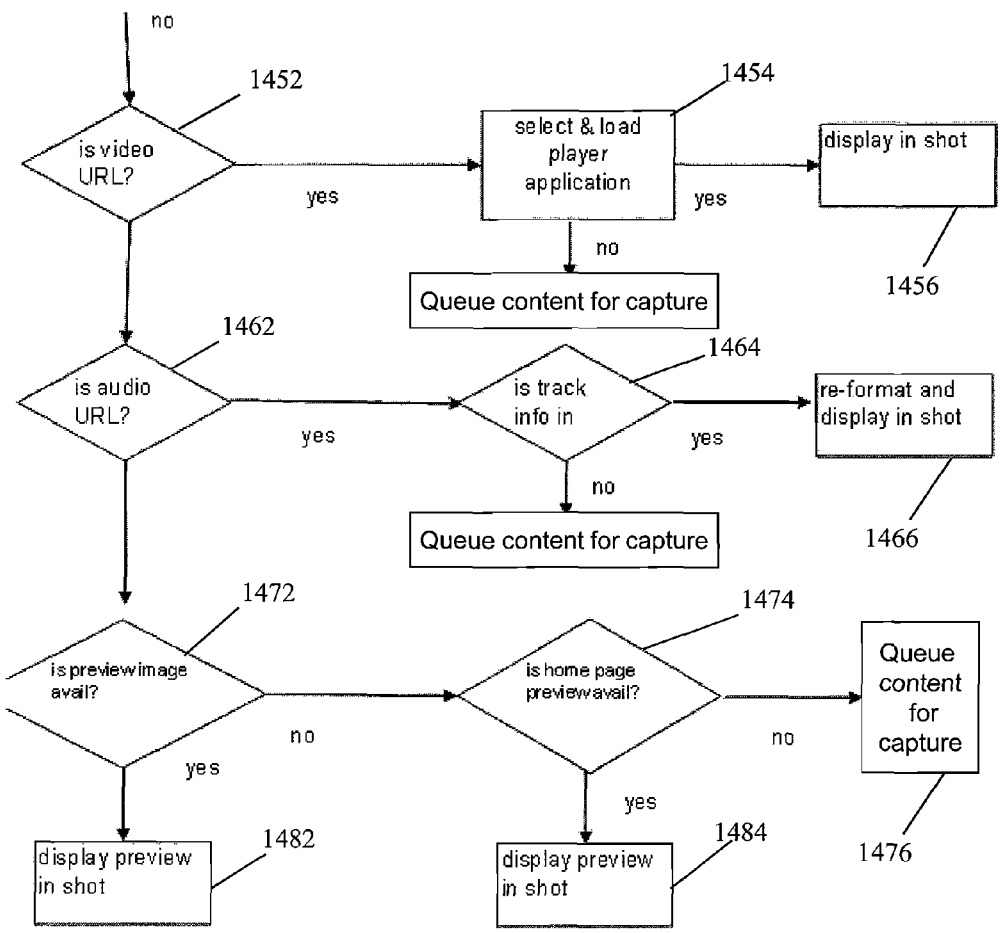
FIG. 15 illustrates the relationship between FIGS. 14A and 14B.

Referring to FIGS. 14A and 14B, if the resource to which the CCDS 1300 is targeted is a Really Simple Syndication (RSS) site, the decision block 1402 is answered in the affirmative and site formatted 1406 for display in an RSS bubble type if a current version of the RSS content available 1404 in local cache memory. If the targeted resource is a movie advertisement, for example, the decision block 1412 is answered in the affirmative and the movie ad formatted 1416 for display in a movie bubble type if information sufficient for an abstract about the movie is available 1414 in local cache memory. If the targeted resource is a wikipedia page, the decision block 1422 is answered in the affirmative and the wiki information formatted 1426 for display in a wiki bubble type if information with which to generate an abstract is available 1424 in local cache memory. If the targeted resource is a social networking page, the decision block 1432 is answered in the affirmative and the information about the page formatted 1436 for display in an applicable bubble type if available 1434 in local cache memory. If the targeted resource is a financial page including a company name or ticker symbol, the decision block 1442 is answered in the affirmative and the information about the page formatted 1446 for display in a stock bubble type enabled with a player application 1444 for generating a graphical representation of the stock's market price over a predetermined period of time like a day, week, or month, for example. The graph of the stock price can be compiled from third party sources and need not be present in the target resource to qualify for display in the bubble. If the information needed for any of the bubbles is not available in cache memory, the sources of information are queued up in the crawler for purposes of capturing that content.

If the targeted resource is a video file, the decision block 1452 is answered in the affirmative and a select frame of the video queued up 1456 in a video bubble type enabled with a player application 1454, if the appropriate player is available. If the targeted resource is an audio file, the decision block 1462 is answered in the affirmative and the audio file queued up 1466 with a play button and background information, if the background information about the file is available 1464. If none of the dedicated types of bubbles above is applicable, decision block 1472 is answered in the negative and the template selection module 1316 presents a preview image of the target website, if the preview image is available 1474 in memory.

The method described above uses the URL embedded in the hyperlink in order to determine the most appropriate bubble type. In other embodiments, the bubble type is selected based on a look table or other related technique that bases the decision on text other hyperlinks, or the language of the publisher's page or publisher's site.

Once the applicable bubble type is determined and the template identified, the content selection module 1318 determines the appropriate information for display in the first area and second area of the bubbles. The abstract of information generally includes information from the target resource, although it may further include information from other sources that is selected based on its contextual relevance. Information that may be retrieved from third party sources includes, but is not limited to, current stock price information, and historical stock price information, for example. In order to ensure that an abstract's information is timely, a crawler 1340 periodically crawls and caches the target resources in accordance with a schedule provided by the scheduler 1350. The information from the target resource and one or more third parties, if applicable, is condensed into an abstract that is preformatted for presentation in the applicable bubble type.

The content selection module 1318 is also configured to select the appropriate information for display in the second area of the bubbles. As discussed above, the second area may dynamically select a search box, hyperlinks with suggested searches, hyperlinks to related resources, or a combination thereof. In some embodiments, one or more of the related links include links to advertiser web pages for which advertisers offer compensation based on the click-through rate. The advertisers may upload these URLs and associated offers using the interface 1360. Advertiser links may be selected for inclusion in the bubble in accordance with the following procedure: First, the CCDS 1300 extracts terms representing key concepts from multiple sources such as one or more words/terms of the publisher page, one or more words/terms of the target page, the publisher host, the target host, which of a plurality of subject categories associated with the word/term, the language of the publisher and/or target page. Second, the terms are initially scored and filtered by inverse document frequency, term frequency and other standard information retrieval techniques. Third, the highest scoring terms are then scored by a final monetization algorithm which is based on an estimate of depth of ad inventory and frequency of click to determine likely monetization. The invention allows third parties who do not have access to the search-engine or ad-networks CPCs to still effectively rank terms based on likely payout. Lastly, the highest scoring terms from the publisher page, target page, publisher host, target host, category, language are then blended based on overall click-through rates of those terms in those subject classes.

The embodiment of the invention discussed above is preferably implemented with software application or other machine-readable instructions installed on a server remotely accessible in a data communications network, for example. In some other embodiment, the invention is a client-side software application implemented on user computers. When implemented as a client-side application, the invention is configured to dynamically scan web pages and other documents being displayed in the user's browser window. If the web page being displayed matches one of a predetermined list of URLs, the invention dynamically inserts bubble functionality into the web pages as it is displayed to the user. If the user views search results from a known search engine, for example, the invention identifies the web pages as search results and inserts bubble icons in proximity to one or more of the individual search result listings in the search results page. Thereafter, the user interested in the knowing more about the search result listing may hover the cursor over the corresponding bubble icon to invoke one of the plurality of bubble types that is dynamically selected based on the target URL, for example. The content displayed in the first and second areas of the bubble are also dynamically determined based on various factors including, but not limited to, the context as determined from the search result listing, the target URL, the context as determined from the target page, the target host, a topic category associated with the target page, the language of the target page, or a combination thereof. In some cases, the content presented in the first area of the bubble is determined by parsing the search result listing and/or target page, extracting the context based on keywords and other parsed data, and selecting content that matches the extracted context.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A contextual content delivery system operably connected to one or more publishers via a data communications network, the system comprising a computing device configured to:
   identify one or more conventional hyperlinks in a document;
   for each of the identified hyperlinks:
      determine a context associated with the identified hyperlink;
      select one of a plurality of bubble types based on a uniform resource locator extracted from the identified hyperlink; wherein each of the bubble types comprises a first display area and a second display area;
      select content for the first display area of the associated selected bubble type based on the uniform resource locator extracted from the identified hyperlink; and
      select content for the second display area of the selected bubble type based on the determined context of the identified hyperlink; and
   convert each of the identified hyperlinks to an enhanced hyperlink for invoking the selected bubble type, the selected content for the first display area of the selected bubble type and the selected content for the second display area of the selected bubble type;

display the selected bubble type, the selected content for the first display area of the selected bubble type and the selected content for the second display area of the selected bubble type to a user when invoked by the user.

2. The contextual content delivery system of claim 1, wherein display of the selected bubble type, the selected content for the first display area of the selected bubble type and the selected content for the second display area of the selected bubble type is invoked in response to hovering a cursor over the enhanced hyperlink.

* * * * *